June 14, 1949.                B. G. CARLSON                2,473,361
PNEUMATIC TOOL FOR UPSETTING HOLLOW RIVETS
Filed July 9, 1947
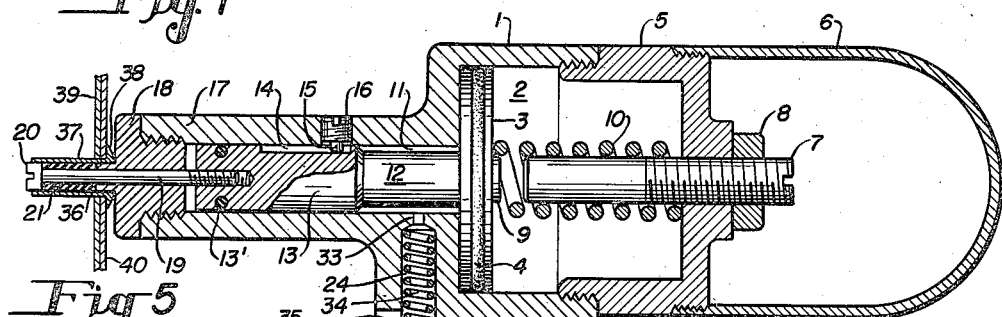
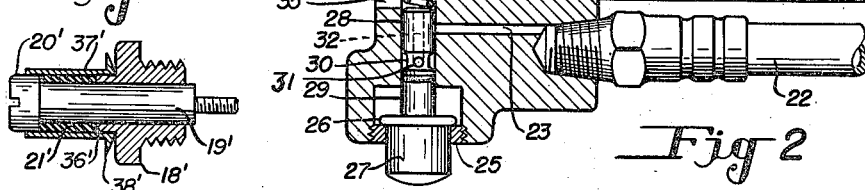
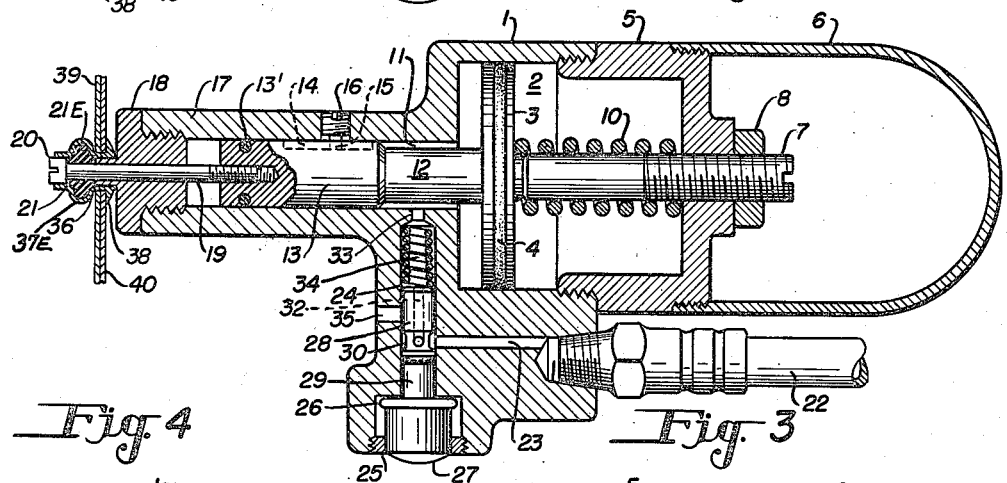
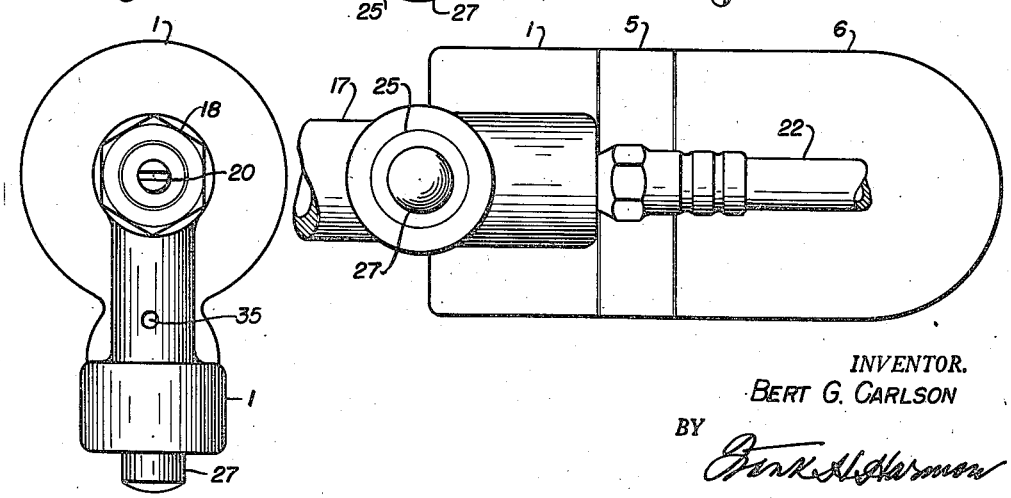
INVENTOR.
BERT G. CARLSON
BY
ATTORNEY Patented June 14, 1949

2,473,361

UNITED STATES PATENT OFFICE 2,473,361

PNEUMATIC TOOL FOR UPSETTING HOLLOW RIVETS

Bert G. Carlson, Gates Mills, Ohio, assignor to The Bellows Company, Akron, Ohio, a corporation of Ohio Application July 9, 1947, Serial No. 759,813

2 Claims. (Cl. 218—19)

This invention relates to improvements in means for expanding rivets and has for its primary object to provide a manually operable blind rivet set, by the use of which the rivet may be inserted in an appropriate hole in the pieces to be riveted together, the rivet expanding tool inserted in the rivet and after simple expanding operation be removed from the rivet for subsequent expanding operations on other rivets.

With this in mind, it is proposed to provide a rivet flaring tool to include a spindle with a rubber-like sleeve and a simple and effective fluid pressure operated tool with manual push button control for retracting the spindle for forcing the rubber sleeve to uniformly expand the rivet. More specifically the invention contemplates an improved fluid pressure operated tool for quick mass blind riveting operation to supplant the mechanical tools for the same purpose disclosed in my United States patents, issued to Bert G. Carlson for Riveting apparatus, No. 2,370,776, March 6, 1945 and for Blind rivet hand tool, No. 2,370,840, March 6, 1945.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in longitudinal section taken through my blind riveting tool and showing the assembly with the unflared rivet thrust through two plates to be riveted together;

Figure 2 is a similar view, showing the rivet flared and the two pieces riveted together;

Figure 3 is a view in bottom plan of the tool;

Figure 4 is an end view of the same; and

Figure 5 is a view in longitudinal section taken through a larger plug, spindle, rubber sleeve and rivet.

Referring more particularly to the drawings, the device may comprise a casing 1 with a bore 2 to slidably receive a piston 3 with a packing ring 4. In the bore 2 is removably screw-threaded a plug 5 and removably screw-threaded on plug 5 is a hand housing 6. Removably and adjustably extending through plug 5 is a partially screw-threaded bolt 7 that may be held in adjusted position by a nut 8. Surrounding bolt 7 and central shank 9 of the piston is a compression coil spring 10 which bears on the stationary inner surface of plug 5 to normally force the piston to the left against its seat in casing 1.

On the left side of the piston the casing 1 is reduced in cross-section at 17 and has a reduced bore 11 to receive a piston rod having a reduced portion 12 with appreciable radial clearance between it and bore 11 and a portion 13 of greater cross-section so as to be snugly slidable in bore 11 and provided with a packing ring 13'. A keyway 14 may be provided in rod portion 13 to receive a ball 15 urged thereinto by a set screw 16 in the casing 17 to permit sliding but prevent rotation of the rod. The forward end of casing 17 is interiorly screw-threaded to removably receive a screw plug 18. In the forward end of piston rod 13 is removably screw-threaded a bolt 19 that is slidable in plug 18 and terminates at its forward end in an enlarged slotted head 20. Bolt 19 also extends through a removable sleeve 21 of rubber, or the like, and whose normal cross-section may be equal to that of bolt head 20.

To the casing is also removably secured an intake pipe 22 leading from a suitable source of pressure fluid to a horizontal restricted passage 23 which latter leads to a larger vertical passage 24. To the bottom of the casing is removably secured a screw plug 25 to retain against removal the lip 26 of a manually operable push button 27 of a spring plunger having upper and lower valve lands 28 and 29 and an intermediate reduced portion 30. Reduced portion 30 has a small hole 31 leading from its annular clearance in passage 24 to a vertical passage 32 shown in dotted lines to extend upwardly through upper valve land 28. A restricted passage 33 provides communication between passage 24 and the radial clearance about rod 12 in bore 11. A compression coil spring 34 normally forces the push button and its valve lands downwardly into their respective normal inoperative positions shown in Figure 1.

As an embodiment of my invention, I have shown it as adaptable as a tool for accomplishing "blind" riveting. Thus when it is desired to operate the tool for this purpose, a sleeve 21 of rubber, or the like, of a desired given length, is slipped over bolt 19 and the latter slid through plug 18 and the screw slot head manually turned to screw the bolt into rod 13 to bring one end of sleeve 21 into abutment with head 20 and the other end with the reduced projection 36 of plug 18 without compressing sleeve 21 so that the outside diameters of head 20, sleeve 21 and projection 36 are approximately equal. Then the rivet 37 is loosely placed around sleeve 21 so that the permanently flared head 38 slides over projection 36 to abut the shoulder of the larger portion of plug 38. This assembly is then manually thrust through registering openings in plates 39 and 40 until the flared head 38 of the rivet abuts the outer, or visible, surface of plate 39 as it is too large to pass through the hole in the plate 39. The left side of plate 40 is the "blind" side and the problem is to effect an expansion of the rivet barrel on the "blind" side of the plate 40 so as to permanently rivet plates 39 and 40 together.

To accomplish this, push button 27 is pressed inwardly against the action of spring 34 to the position shown in Figure 2. This brings upper valve land 28 in a position to close the exhaust outlet 35 in the casing which communicates with passage 24. It also brings hole 31 and the radial clearance about the reduced portion 30 of the plunger into registry with restricted passage 23. Thus, the pressure fluid flows through intake pipe 22, through passage 23, hole 31, passage 32, passage 24, passage 33 into the radial clearance about rod 12 in bore 11. This forces the piston to the right against the action of spring 10 until shank 9 abuts the adjustable length bolt 7 as a limit stop as viewed in Figure 2.

The result of this action is to draw bolt 19 and its enlarged head 20 to the right to radially expand the sleeve 21 as well as the rivet barrel on the left, or "blind" side of plate 40. The radially expanded portion of sleeve 21 is shown at 21E. This is a temporary deformation of the rubber sleeve but as it expands it forces the rivet 37 to be permanently expanded as shown at 37E, both on the "blind" side of plate 40.

It follows that a release of normal pressure on the push button permits spring 34 to return the push button and its valve lands to their positions shown in Figure 1. In this position further access of pressure fluid from passage 23 to passage 24 is shut off by the lower valve land 29. Spring 10 in forcing the piston to the left to normal inoperative position exhausts the pressure in the chamber behind the piston through the exhaust port 35.

Figure 5 shows a plug 18' similar to plug 18, but having a larger hole to receive a larger rod 19' of greater length or diameter, or both, and having a larger head 20' to retain a sleeve 21' of greater length or cross section or both for retaining and expanding a larger blind rivet 37', or other articles to be expanded, which articles may be of greater length or cross-section, or both. This is to illustrate that the casing and the operating mechanism is adapted to receive and flare any number of sizes of rivets. Moreover, the construction and operation of the fluid pressure operating mechanism and the simple and effective manual push button control make for efficient mass operation.

I claim:

1. In a riveting tool for flaring the barrel portion of a hollow rivet having a preformed flared head to rivet two pieces of material together and which tool includes a spindle for carrying a rivet, manually controllable fluid pressure operated means for drawing the forward end of said spindle toward said means to radially flare said rivet barrel underneath the second of said two pieces of material and means for returning said spindle to normal position upon release of said fluid pressure operated means, said pressure operated means comprising a casing, a piston slidably mounted in a cylinder in said casing and having a stem extending forwardly thereof, said stem having a reduced portion with clearance in said housing to form an annular passage in communication with said cylinder on one side only of said piston, an inlet from a source of fluid pressure and an intermediate passage between said inlet and annular passage, an exhaust outlet leading from said intermediate passage, a valve in said intermediate passage and means for normally maintaining said valve in position to open communication from said intermediate passage to said exhaust outlet and close communication to said intermediate passage from said inlet, said valve being manually operable to close communication from said intermediate passage to said exhaust outlet and open communication to said intermediate passage from said inlet and to said cylinder from said inlet.

2. In a riveting tool for flaring the barrel portion of a hollow rivet having a preformed flared head to rivet two pieces of material together and which tool includes a spindle for carrying a rivet, manually controllable fluid pressure operated means for drawing the forward end of said spindle head toward said pieces to compress and radially flare said rivet barrel on the underside of said pieces and resilient means for returning said spindle to normal position upon release of said fluid pressure operated means, said pressure means comprising a casing, a piston slidably mounted in said casing and having a stem extending forwardly thereof, said stem having an annular passage thereabout in communication with said cylinder on one side only of said piston, an inlet from a source of fluid pressure and an intermediate passage between said inlet and annular passage, an exhaust outlet leading from said intermediate passage, a valve in said intermediate passage and spring means for normally maintaining said valve in position to open communication between said annular passage and said exhaust and piston spring means for normally forcing said piston to exhaust fluid from said cylinder to said annular passage, a manual control for operating said valve against its spring means to open communication from said source through said intermediate and annular passages to said cylinder to operate said piston against its spring means while closing said exhaust outlet.

BERT G. CARLSON.

REFERENCES CITED

The following references are of record in the file of this patent:

UNITED STATES PATENTS

| Number | Name | Date |
|---|---|---|
| 2,053,716 | Huck | Sept. 8, 1936 |
| 2,370,840 | Carlson | Mar. 6, 1945 |
| 2,384,347 | Schulz | Sept. 4, 1945 |